US012783358B1

(12) United States Patent
Natanzon et al.

(10) Patent No.: US 12,783,358 B1
(45) Date of Patent: Nov. 3, 2026

(54) SYSTEM AND METHOD FOR INTEGRATING DATA BACKUP WITH MODEL CONTEXT PROTOCOL FOR METADATA-BASED QUERYING

(71) Applicant: Eon IO, Ltd., Tel Aviv (IL)

(72) Inventors: Assaf Natanzon, Tel Aviv (IL); Ron Kimchi, Tel Aviv (IL); Yair Weiss, Givatayim (IL); Dmitry Kuznetsov, Tel Aviv Yafo (IL); Benjamin Gruenbaum, Herzliya (IL); Rachel Neriya Schifter, Herzliya (IL); Roy Caldararu, Tel Aviv (IL)

(73) Assignee: Eon IO, Ltd., Tel Aviv (IL)

( * ) Notice: Subject to any disclaimer, the term of this patent is extended or adjusted under 35 U.S.C. 154(b) by 0 days.

(21) Appl. No.: 19/265,070

(22) Filed: Jul. 10, 2025

(51) Int. Cl.
*G06F 11/1446* (2026.01)

(52) U.S. Cl.
CPC ...... *G06F 11/1448* (2013.01); *G06F 2201/84* (2013.01)

(58) Field of Classification Search
CPC .......................... G06F 11/1448; G06F 2201/84
See application file for complete search history.

(56) References Cited

U.S. PATENT DOCUMENTS

2026/0004166 A1* 1/2026 Turan ....................... G06N 5/04
2026/0058997 A1* 2/2026 Qureshi .................. H04L 63/20
2026/0140791 A1* 5/2026 Chilakamarri ...... G06F 11/3409
2026/0147332 A1* 5/2026 Alimo ................ G05B 19/4155
2026/0162013 A1* 6/2026 Arbuckle .............. G06N 20/00

FOREIGN PATENT DOCUMENTS

CN 120013493 A * 4/2025

OTHER PUBLICATIONS

Battista, Model Context Protocol (MCP) and Amazon Bedrock, Mar. 19, 2025 (Year: 2025).*
Bonawitz K, Ivanov V, Kreuter B, Marcedone A, McMahan HB, Patel S, Ramage D, Segal A, Seth K. Practical secure aggregation for privacy-preserving machine learning. Inproceedings of the 2017 ACM SIGSAC Conference on Computer and Communications Security Oct. 30, 2017 (pp. 1175-1191). (Year: 2017).*
Cella et al., WO 2026/112646 A1, Priority date: Jan. 9, 2025 (Year: 2025).*

(Continued)

*Primary Examiner* — Mohsen Almani
(74) *Attorney, Agent, or Firm* — M&B IP Analysts, LLC

(57) ABSTRACT

A method for data backup is presented. The method includes capturing, by a backup system, a snapshot of source data from a computing environment. The method further includes generating metadata based on the captured snapshot, storing the generated metadata in backup storage, and generating, within the backup system, Model Context Protocol-compliant functions using the stored metadata. Additionally, the method includes transmitting the Model Context Protocol-compliant functions to a Model Context Protocol host and receiving, from the Model Context Protocol host, queries corresponding to at least one of the transmitted functions. The method also includes evaluating the received queries and providing, to the Model Context Protocol host, a response corresponding to the queries.

20 Claims, 7 Drawing Sheets

(56) References Cited

OTHER PUBLICATIONS

Hasan MM, Li H, Fallahzadeh E, Rajbahadur GK, Adams B, Hassan AE. Model context protocol (mcp) at first glance: Studying the security and maintainability of mcp servers. ACM Transactions on Software Engineering and Methodology. Jun. 2025. (Year: 2025).*

Ray PP. A survey on model context protocol: Architecture, state-of-the-art, challenges and future directions. Authorea Preprints. Apr. 18, 2025. (Year: 2025).*

Sandeep, MCP-A Beginner's Guide, Apr. 3, 2025 (Year: 2025).*

Sarkar A, Sarkar S. Survey of llm agent communication with mcp: A software design pattern centric review. arXiv preprint arXiv:2506. 05364. May 26, 2025. (Year: 2025).*

Singh, Aditi, et al. "A survey of the model context protocol (mcp): Standardizing context to enhance large language models (llms)." (2025). (Year: 2025).*

"Get Started with the Model Context Protocol (MCP)." Model Context Protocol, modelcontextprotocol.io/introduction. Accessed Jul. 10, 2025.

* cited by examiner

| METADATA AND RELATION STORE 600 (LOGICAL VIEW) | |
|---|---|
| COLUMN METADATA 610 | COLUMN RELATION INDEX 630 |
| column identifier 612<br>source object reference 614<br>column name 616<br>semantic class 618<br>value count 620<br>value range (min/max) 622<br>representative values 624<br>statistical signature 626<br>last updated timestamp 628 | left column reference 632<br>right column reference 634<br>similarity metric A (e.g., Jaccard) 636<br>similarity metric B (e.g., sequence-based) 638<br>composite join score 640<br>type weighting 642<br>sample size 644<br>last computed timestamp 646 |

FIGURE 6

SYSTEM AND METHOD FOR INTEGRATING DATA BACKUP WITH MODEL CONTEXT PROTOCOL FOR METADATA-BASED QUERYING

TECHNICAL FIELD

The present disclosure relates generally to backup-management technologies, and more particularly, to systems and methods for integrating data backup operations with Model Context Protocol-compliant interfaces to enable metadata-based querying of backup data.

BACKGROUND

Conventional cloud-scale backup platforms focus on redundancy and point-in-time recovery. They are typically not designed to support high-level, semantic queries, particularly those posed by AI or large-language-model (LLM) agents.

When an analyst or LLM needs answers that span many terabytes of historical snapshots, today's options are limited: either perform full-table scans at query time or run costly, bespoke ETL jobs to pre-materialize subsets of the data. Both approaches drive up latency, cloud-compute expenditure, and operational complexity.

The emerging Model Context Protocol (MCP), developed by Anthropic PBC, enables computing systems to register small, read-only ("side-effect-free") functions. An LLM can chain those functions to answer natural-language queries. However, mainstream backup systems neither expose MCP-compliant APIs nor retain the rich column-level statistics (e.g., semantic types, join-likelihood scores) needed by such agents. Consequently, LLM-driven exploration of backup data remains impractical without extensive post-processing or manual schema annotation.

It would therefore be advantageous to provide a backup solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that, in operation, cause(s) the system to perform the actions. One or more computer programs can be configured to perform particular operations or actions by virtue of including instructions that, when executed by data processing apparatus, cause the apparatus to perform the actions.

In one general aspect, the method may include capturing, by a backup system, a snapshot of source data from a computing environment. The method may also include generating metadata based on the captured snapshot. The method may furthermore include storing the generated metadata in backup storage. The method may, in addition include generating, within the backup system, Model Context Protocol-compliant functions using the stored metadata. The method may moreover include transmitting the Model Context Protocol-compliant functions to a Model Context Protocol host. The method may also include receiving, from the Model Context Protocol host, queries corresponding to at least one of the transmitted functions. The method may furthermore include evaluating the received queries. The method may in addition include providing, to the Model Context Protocol host, a response corresponding to the queries. Other embodiments of this aspect include corresponding computer systems, apparatus, and computer programs recorded on one or more computer storage devices, each configured to perform the actions of the methods.

Implementations may include one or more of the following features. The method where storing the generated metadata in backup storage further may include storing the metadata in objects that are physically separate from backup files that contain raw data blocks of the snapshot. The method where generating the Model Context Protocol-compliant functions may include defining at least a list tables function, a get column metadata function, a get intersections function, and a get column distribution function, each having a declared argument schema and return-value schema. The method where receiving the queries further may include validating each query against a stored JSON schema that corresponds to the identified Model Context Protocol-compliant function before evaluating the query. The method where transmitting the Model Context Protocol-compliant functions to the Model-Context-Protocol host may include serializing the functions and their respective schemas in a canonical JSON representation. The method where generating the metadata may include, for each column reconstructed from the snapshot, performing at least one of: assigning a semantic class, computing at least one descriptive statistic, and generating a hash-based signature. The method may include, in response to a change in the Model Context Protocol-compliant functions or their associated schemas, detecting that updated metadata have been stored in the backup storage, regenerating the Model Context Protocol-compliant functions using the updated metadata, and retransmitting the regenerated functions to the Model Context Protocol host. The method where providing the response may include, for each received query, generating a JSON object that conforms to the return-value schema of the Model Context Protocol-compliant function. The method where evaluating the received queries may include retrieving, from the backup storage and without accessing backup files that store the snapshot, metadata identified by the queries. Implementations of the described techniques may include hardware, a method or process, or a computer-tangible medium.

In one general aspect, a non-transitory computer-readable medium may include one or more instructions that, when executed by one or more processors of a device, cause the device to. Non-transitory computer-readable medium may also include capture, by a backup system, a snapshot of source data from a computing environment. The medium may furthermore include generate metadata based on the captured snapshot. The medium may in addition include store the generated metadata in backup storage. The medium may moreover include generate, within the backup system, Model Context Protocol-compliant functions using the stored metadata. The medium may also transmit the Model Context Protocol-compliant functions to a Model Context Protocol host. The medium may furthermore include receiving, from the Model Context Protocol host, queries corresponding to at least one of the transmitted functions. The medium may in addition include evaluate the received queries. The medium may moreover provide, to the Model Context Protocol host, a response corresponding to the queries. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the instructions that store the generated metadata further may include instructions that, when executed, cause the device to store the metadata in objects that are physically separate from backup files containing raw data blocks of the snapshot. Implementations of the described techniques may include hardware, a method or process, or a computer-tangible medium.

In one general aspect, a system may include a processing circuitry having one or more processors. The system may also include a memory, the memory containing instructions that, when executed by the processing circuitry, configure the system to. The system may furthermore include capture, by a backup system, a snapshot of source data from a computing environment. The system may in addition include generate metadata based on the captured snapshot. The system may moreover store the generated metadata in backup storage. The system may also generate, within the backup system, Model Context Protocol-compliant functions using the stored metadata. The system may furthermore transmit the Model Context Protocol-compliant functions to a Model Context Protocol host. The system may in addition receive, from the Model Context Protocol host, queries corresponding to at least one of the transmitted functions. The system may moreover evaluate the received queries. The system may also provide, to the Model Context Protocol host, a response corresponding to the queries. Other embodiments of this aspect include corresponding computer systems, apparatus, and computer programs recorded on one or more computer storage devices, each configured to perform the actions of the methods.

Implementations may include one or more of the following features. The system where the one or more processors, when storing the generated metadata in backup storage further, are configured to store the metadata in objects that are physically separate from backup files that contain raw data blocks of the snapshot. The system where the one or more processors, when generating the Model Context Protocol-compliant functions, are configured to define at least a list tables function, a get column metadata function, a get intersections function, and a get column distribution function, each having a declared argument schema and return-value schema. The system where the one or more processors, when receiving the queries further, are configured to validate each query against a stored JSON schema that corresponds to the identified Model Context Protocol-compliant function before evaluating the query. The system where the one or more processors, when transmitting the Model Context Protocol-compliant functions to the Model-Context-Protocol host, are configured to serialize the functions and their respective schemas in a canonical JSON representation. The system where the memory further stores instructions that, when executed, cause the processing circuitry, for each column reconstructed from the snapshot, to perform at least one of: assign a semantic class, computing at least one descriptive statistic, and generating a hash-based signature. The system where the memory further stores instructions that, when executed, cause the processing circuitry, in response to a change in the Model Context Protocol-compliant functions or their associated schemas, to: detect that updated metadata have been stored in the backup storage, regenerate the Model Context Protocol-compliant functions using the updated metadata, and retransmit the regenerated functions to the Model Context Protocol host. The system where the one or more processors, when providing the response, are configured to generate, for each received query, a JSON object that conforms to the return-value schema of the Model Context Protocol-compliant function to which the query corresponds. The system where the one or more processors, when evaluating the received queries, are configured to retrieve, from the backup storage and without accessing backup files that store the snapshot, metadata identified by the queries. Implementations of the described techniques may include hardware, a method or process, or a computer-tangible medium.

Embodiments of the present disclosure may be provided as a network of communicating devices (i.e., a "computerized network"). Embodiments of the invention may also be provided as a software application downloadable into a computer device to facilitate the method. The software application may be a computer program product, which may be stored on a non-transitory computer-readable medium on a tangible data-storage device (such as a storage device of a server, or one within a user device).

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings, in which:

FIG. 6 is a logical diagram illustrating an example metadata-and-relation store that contains column-metadata and a column-relation index, in accordance with an embodiment of the present disclosure.

DETAILED DESCRIPTION

Figure 1:
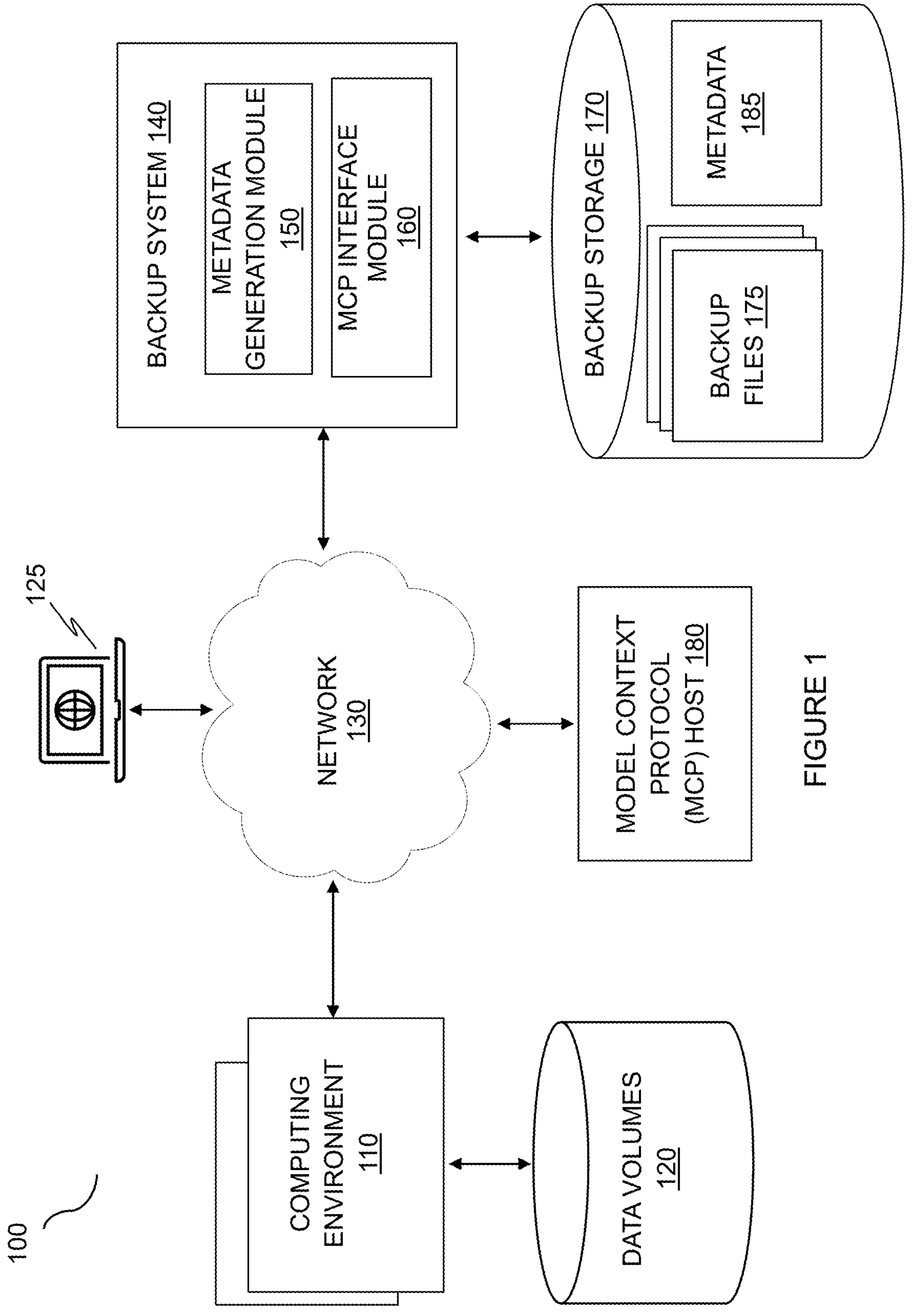
FIG. 1 is a block diagram of an example backup architecture that stores snapshot metadata and exposes Model-Context-Protocol (MCP) functions to an MCP host, in accordance with an embodiment of the present disclosure.

It is important to note that the embodiments disclosed herein are only examples of the many advantageous uses of the innovative teachings herein. Statements made in the specification of the present application do not necessarily limit any of the various claimed embodiments. Moreover, some statements may apply to some inventive features but not to others. Unless otherwise indicated, singular elements may be in plural and vice versa with no loss of generality. In the drawings, like numerals refer to like parts throughout several views.

FIG. 1 is a block diagram of an example backup architecture that stores snapshot metadata and exposes Model-Context-Protocol (MCP) functions to an MCP host, in accordance with an embodiment of the present disclosure. As shown in FIG. 1, the architecture 100 includes: a computing environment 110; one or more data volumes 120 logically associated with the computing environment 110; a network 130 that conveys snapshot data (or streamed snapshot blocks) together with MCP catalogue and request/response messages and control traffic; an optional administrator console 125; a backup system 140 that contains a metadata-generation module 150 and an MCP-interface module 160; a backup-storage repository 170 that persistently retains backup files 175 and metadata records 185; and an MCP host 180 that consumes the MCP-compliant functions exported by backup system 140. Additional technical details concerning each element are described below.

In some embodiments, computing environment 110 is configured as a virtual machine (VM), a containerized workload, a bare-metal host, a file-system instance, or a managed database service (e.g., Amazon RDS). One or more data volumes 120 expose conventional block-device interfaces (such as SCSI, NVMe, or virtio-blk) or present as file-system paths or database storage volumes to an operating system executing within computing environment 110. As disclosed, tables within the volumes are scanned during backup to collect semantic and statistical metadata before they are converted to a columnar format such as Parquet. The computing environment 110 may continue to execute production workloads while snapshot-capture logic within the backup system 140 orchestrates a platform-native snapshot mechanism residing in the computing environment (for example, a cloud-block snapshot API, a logical database dump, a file-system freeze procedure, or a database-native snapshot) to capture a crash-consistent or application-consistent image of each data volume. Within backup system 140, the snapshot-capture logic issues a request that initiates the point-in-time snapshot, acquires the resulting data blocks as they are emitted by the snapshot mechanism, and streams those blocks in discrete portions across network 130 to downstream processing logic, including metadata-generation module 150, for the semantic and statistical analysis described herein.

In some embodiments, data volumes 120 are logical storage units associated with computing environment 110. Depending on the deployment, a given volume may be implemented as a cloud-block disk, a database tablespace, or a folder (prefix) within an object store. During a backup operation, backup system 140 may process each volume as an atomic snapshot source, thereby capturing a crash-consistent or application-consistent image (e.g., RDS snapshots are application-consistent) of the entire volume, including both user records and file-system metadata, for subsequent semantic and statistical analysis by metadata-generation module 150 as described herein.

In some embodiments, network 130 establishes the bidirectional link between computing environment 110, backup system 140, and MCP host 180. During a backup, it may carry (i) a high-throughput snapshot data stream and (ii) lower-bandwidth control traffic such as orchestration commands, metadata-registration messages, and MCP operation requests and responses, allowing metadata-generation module 150 to process records continuously as they arrive. Network 130 may be implemented as an optionally encrypted virtual-private-cloud (VPC) peering connection, an IPsec tunnel, or an equivalent secure channel, provisioned with sufficient bandwidth to stream snapshot data while maintaining low-latency delivery of MCP traffic.

In some embodiments, an administrator console 125 provides an optional management interface through which an operator may schedule backups or adjust high-level metadata parameters. The console 125 may be implemented as a web-based dashboard or as a REST-style API, each secured by role-based access control. In fully autonomous deployments, console 125 may be omitted, and backup system 140 operates under pre-provisioned default policies.

In some embodiments, backup system 140 may orchestrate (i) acquisition of point-in-time snapshots from computing environment 110, (ii) generation and durable storage of semantic and statistical metadata, (iii) provision of Model-Context-Protocol (MCP) function catalogues to MCP host 180, and (iv) processing of MCP operation requests issued by MCP host 180. Although FIG. 1 expressly depicts backup system 140 as including metadata-generation module 150 and MCP-interface module 160, each of those modules (and therefore backup system 140 as a whole) may, in practice, be realized by multiple cooperating service instances that share a common configuration store and communicate over an internal messaging layer. During a representative backup cycle, backup system 140 (*a*) invokes the snapshot mechanism resident in computing environment 110, (b) reads the resulting snapshot or streamed data through network 130, (c) processes that data via metadata-generation module 150, and (d) commits the backup files 175 and metadata records 185 to backup-storage repository 170. Once metadata generation is complete, the system 140 may cause the MCP-interface module 160 to generate and provide a refreshed function catalogue, after which MCP-interface module 160 remains available to evaluate and respond to subsequent MCP operation requests.

In some embodiments, metadata-generation module 150 receives a sequence of data blocks obtained during snapshot capture and reconstructs logical tables or columnar fragments from those blocks. Operating on each reconstructed column, the module 150 may assign a semantic class (for example, personal-name, timestamp, currency amount, identifier, or free-form text) by evaluating value shapes, character sets, and domain heuristics that are maintained in an extensible rule set. The resulting class assignment enables downstream processes to apply type-appropriate statistical techniques while avoiding costly full-data scans.

Once a semantic class has been assigned, the module 150 computes descriptive statistics for the column. In some embodiments, the statistics include (i) a total-value count and a distinct-value count; (ii) minimum and maximum values together with optional numeric quantiles when the data type is ordinal or numeric; and (iii) a histogram or other frequency distribution that conveys the relative occurrence of representative values. The resulting metrics may be persisted as part of the column-metadata record and are addressable by the MCP functions exported through interface module 160.

To support similarity estimation and prospective join analysis, the metadata-generation module 150 may also derive one or more hash-based signatures for each column. Example techniques include MinHash sketches and sequence-aware hashes. Since the signatures are smaller than the underlying value sets, they facilitate efficient, in-memory comparison of distinct columns without loading all values concurrently. A companion routine may iterate over column pairs and stores, in a relation index, metrics such as Jaccard similarity, sequence-alignment similarity, and a composite join-likelihood score. Each per-column and per-pair record may be tagged with the snapshot identifier and the exact generation timestamp. These tags form an audit trail that downstream components can inspect to confirm data freshness.

In some embodiments, module 150 may define a set of configurable parameters that allow the metadata workflow to be adapted to heterogeneous datasets. By way of example, an operator may (i) increase or decrease the sampling ratio applied to high-cardinality tables, (ii) select alternative semantic-typing models, or (iii) suppress the collection of specified metrics for columns designated as out of scope. Parameter updates may be communicated through administrator console 125 and take effect for subsequent snapshot iterations, thereby preserving reproducibility of metadata generated for earlier backups.

In some embodiments, the MCP-interface module 160 establishes a logical interface through which an external Model-Context-Protocol (MCP) client (such as a large-language-model deployment) can request snapshot-derived metadata from backup system 140. The module performs three primary functions: defining the callable MCP tools, communicating those tool definitions to MCP host 180, and processing subsequent operation requests that reference the registered tools.

At the end of an initial backup cycle, the module constructs a function catalogue that conforms to the type-schema rules mandated by the MCP specification and registers that catalogue with the MCP host 180. An illustrative catalogue contains functions for (i) enumerating every table discovered in the most-recent snapshot, (ii) returning semantic and statistical metrics for a designated column, (iii) supplying pre-computed similarity scores for a specified column pair, (iv) providing a histogram of values for a selected column, (v) listing available columns for a given table, (vi) returning columns of a specified semantic type, (vii) finding columns similar to a reference column, and (viii) a snapshot-listing API function that enumerates snapshot identifiers together with their creation timestamps. Each function entry may specify its argument names, argument data types, and an explicit JSON schema describing the structure of its return value. In some embodiments, since the functions are defined once and internally reference either the latest snapshot or a caller-supplied snapshot identifier, subsequent backup cycles do not require transmitting a new catalogue; the previously registered functions automatically return results that reflect the most up-to-date metadata. Since the catalogue includes the JSON schemas in advance, MCP host 180 can verify, before execution, that each MCP function request conforms to the expected argument and return-type definitions.

After compiling the catalogue, MCP-interface module 160 serializes the catalogue in a canonical JSON representation and conveys the resulting message across network 130 to MCP host 180. During normal operation the module 160 remains in a ready state and processes MCP function requests that reference one of the published entries. For each incoming request the module 160 (*i*) validate the request body against the stored JSON schema and (ii) retrieve the required metadata from repository 170. A response that conforms to the declared return-type definition can then be generated and transmitted to MCP host 180.

In some embodiments, backup-storage 170 provides durable, immutable storage for backup files 175 and metadata records 185. The backup storage 170 can be realized as a cloud-based object store (such as an S3-compatible bucket), an on-premises object gateway, or any equivalent storage platform that offers object-level versioning, geo-replication, and time-based retention controls. Objects may be written under keys that embed the snapshot identifier, ensuring that every artefact produced during a particular backup operation is grouped within a deterministic namespace. Retention policies may retain metadata records 185 in a performance tier while migrating older backup files 175 to a lower-cost archival tier, thereby balancing retrieval latency against storage expenditure.

In some embodiments, backup files 175 may store the complete byte-level contents of each snapshot. The physical format of a backup file (e.g. raw block images, compressed columnar fragments, or deduplicated bundles) has no effect on the functions performed by metadata-generation module 150 or MCP-interface module 160. Each file is labelled with (i) the snapshot identifier, (ii) the source-volume identifier, and (iii) optional integrity-verification metadata suitable for restore validation.

In some embodiments, metadata records 185 include (i) a column-metadata entry containing a column identifier, source reference, assigned semantic class, descriptive statistics, one or more statistical signatures, and a generation timestamp and (ii) a companion relation-index entry that stores, for each relevant column pair, the two column identifiers, at least one similarity metric, an optional composite-join score, and a computation timestamp.

In some embodiments, the MCP host 180 represents any external computing system that implements the Model-Context-Protocol (MCP) and is therefore able to parse the function catalogue issued by backup system 140 and transmit properly typed MCP requests. Examples of the MCP host 180 include conversational artificial-intelligence services, data-governance platforms, automated analytics engines, or other large-language-model deployments. In accordance with the MCP specification, the host 180 may first obtain a catalogue, conveyed as a JSON document whose entries define the name, argument schema, and result schema of each registered function, across network 130. The host 180 may store that catalogue locally and perform static or dynamic validation to ensure that every subsequent MCP request conforms to the declared argument and return-type definitions.

During run-time interaction the host 180 may maintain a context that interleaves natural-language content with typed MCP function requests. Each request identifies a particular function (for example, list_tables, get_column_metadata or get intersections) and supplies concrete arguments that reference snapshot identifiers, table names, or column names. Upon receiving such a request, MCP-interface module 160 may authenticate the caller, validates the message body against the stored schema, retrieves the requested metadata from repository 170, and returns a structured response that adheres to the MCP format. The host 180 then incorporates the response into higher-level reasoning tasks, such as generating join plans, composing SQL statements, or producing explanatory text, without accessing the underlying backup files 175.

In preferred embodiments, the MCP protocol is transport-agnostic; it defines a message structure that can be conveyed over HTTP, WebSockets, or comparable channels, provided the host transmits the required JSON envelope and observes the type constraints declared in the catalogue. Accordingly, MCP host 180 can operate either in the same data-center as backup system 140 or remotely over a secured wide-area link. In implementations, the MCP host 180 complies with the MCP tooling schema, thereby ensuring that the function catalogue, subsequent requests, and returned responses remain syntactically and semantically compatible across different implementations.

In one illustrative sequence, backup system 140 first instructs the snapshot mechanism within computing environment 110 to generate a point-in-time copy of each data volume 120. As the snapshot blocks are produced, they are transmitted over network 130 to metadata-generation module 150. Module 150 then derives per-column statistics and relation-index entries while the unmodified blocks are written in parallel to backup files 175. When the analysis is complete, backup files 175 and the corresponding metadata records 185 are committed to repository 170.

Immediately after the metadata has been stored, MCP-interface module 160 generates a revised function catalogue and transmits that catalogue to MCP host 180. At any subsequent time, the host can submit an MCP function request. Upon receipt, module 160 i) validates the message against the previously stored JSON schema, (ii) obtains the referenced metadata from repository 170, and (iii) returns a structured response without re-reading backup files 175. The same sequence is performed for every scheduled or on-demand backup, so each snapshot acquires a unique identifier and a corresponding generation of metadata that remains available for later analytical use.

Backup system 140 provides several technical advantages arising from snapshot-time metadata generation and MCP-based access to that metadata. First, because metadata records 185 are far smaller than backup files 175, MCP requests are served with very low latency and minimal bandwidth. Second, high-cost tasks (semantic classification, statistical aggregation, and similarity scoring) run once per snapshot and are executed while the backup process is already traversing the data so later queries add only a negligible processing load, yielding predictable resource use. Third, security is strengthened: only derived column-level metrics traverse network 130, while raw user data remains in backup-storage repository 170. Fourth, each metadata record bears an immutable snapshot identifier and generation timestamp, providing an audit trail that proves the exact data state for any historical backup. Finally, by publishing a standards-conformant MCP catalogue, backup system 140 enables any MCP-compliant client to access the metrics without custom integration, ensuring long-term interoperability.

Figure 2:
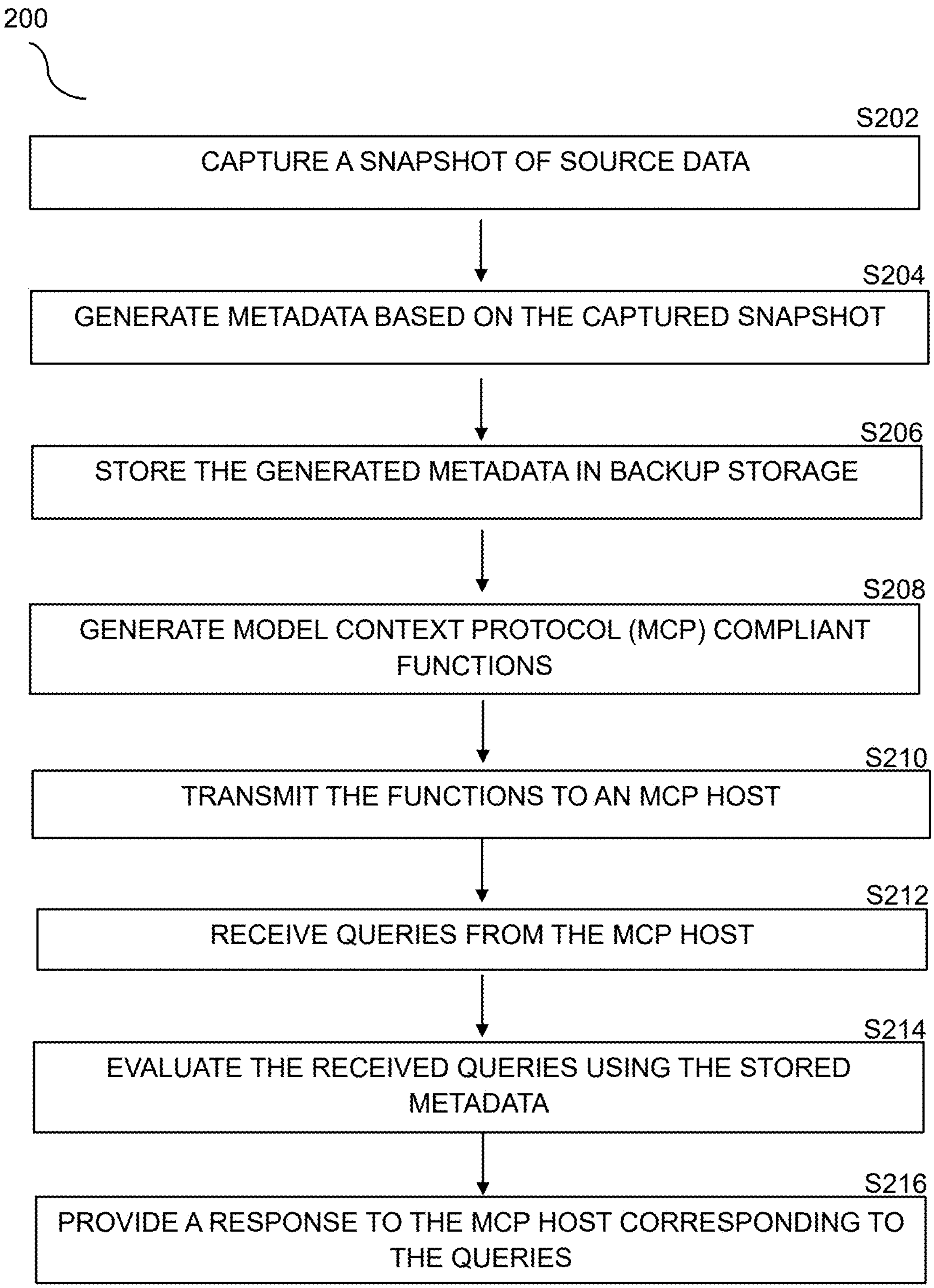
FIG. 2 is a flowchart of an example backup method that captures a snapshot, generates metadata, transmits MCP-compliant functions to an MCP host, and evaluates host queries using the stored metadata, in accordance with an embodiment of the present disclosure.

FIG. 2 is a flowchart of an example backup method that captures a snapshot, generates metadata, transmits MCP-compliant functions to an MCP host, and evaluates host queries using the stored metadata, in accordance with an embodiment of the present disclosure. The method 200 is illustrated from the perspective of backup system 140. The depicted operations therefore include actions executed by the backup system, such as transmitting the MCP function catalogue to host 180 and receiving host-generated queries, while processing performed solely inside the MCP host is not shown. Although the steps are numbered sequentially, individual operations may be carried out concurrently or repeated without departing from the scope of the present disclosure.

At S202, a snapshot of source data is captured. In some embodiments, a platform-native snapshot operation is executed to obtain a crash-consistent, point-in-time image of each data volume that supports the active workload. The resulting image may be serialized as an ordered stream of storage blocks and conveyed to subsequent processing stages. Since the image preserves a self-consistent state, later analytical operations can rely upon its integrity while normal application activity proceeds uninterrupted.

At S204, metadata derived from the captured snapshot are generated. In some embodiments, the incoming stream of storage blocks may be re-assembled into the structured tables embedded in the image, and each column may be examined individually. For every column, a semantic classification (such as timestamp, identifier, monetary value, or free-form text) may be assigned by evaluating character patterns and domain-specific heuristics. Statistical descriptors may be then computed and may include (i) total and distinct value counts, (ii) minimum and maximum values with selected quantiles, and (iii) a representative frequency histogram. To facilitate subsequent similarity analysis, one or more compact hash-based signatures (for example, MinHash sketches or sequence-aware digests) are also generated.

At S206, the generated metadata are stored in backup storage. In some embodiments, column-level records and column-pair relation entries are written as immutable objects whose identifiers embed the unique snapshot label. Each column record contains the semantic class, descriptive statistics, at least one statistical signature, and a generation timestamp; each relation entry stores a similarity metric, such as Jaccard or a composite join score, together with a computation timestamp. Keeping metadata separate from the full snapshot files enables rapid retrieval for analytical queries and ensures that metadata created for successive snapshots do not overwrite one another.

At S208, MCP-compliant functions are generated. In preferred embodiments, this generation occurs during an initial backup and functions may be regenerated only if the function set or its JSON schemas change materially. Upon completion of metadata storage, the newly created records may be traversed to compile a function catalogue that conforms to the type-schema requirements prescribed by the MCP specification. The resulting catalogue may define functions such as list_tables, get_column_metadata, get_intersections, and get_column_distribution. Each entry may specify a symbolic name, typed arguments, and an explicit JSON schema describing the return structure; argument definitions may include a snapshot identifier so that callers can reference a particular generation of metadata. In some embodiments, each function either accepts a snapshot identifier as an argument or internally references the latest snapshot. As a result, the same set of functions automatically returns results that reflect every subsequently backed-up resource, without requiring catalogue re-registration after each backup. Since the catalogue is derived solely from compact metadata, its size is modest and can reside in volatile or persistent storage until transmitted in the next operation.

At S210, the generated functions are transmitted to an MCP host. In some embodiments, the catalogue may be serialized in canonical JSON format and conveyed across a network via a transport that preserves message integrity and conforms to MCP framing requirements. Upon receipt, the MCP host may parse the catalogue and store the declared argument and return schemas for each function, thereby enabling type-conformant requests.

At S212, queries are received from the MCP host. After catalogue registration, the host can invoke any published function by transmitting a JSON-RPC request that specifies the function name and supplies concrete arguments, such as a snapshot identifier, table name, or column identifier. In some embodiments, when the host does not yet know a valid snapshot identifier, it can first call a snapshot-listing API function (e.g., list_snapshots) to obtain the latest snapshot, a snapshot by timestamp, or the full set of available snapshot IDs, and then include the chosen identifier in subsequent requests. In some embodiments, each incoming request is detected, the function identifier and argument payload are extracted, and the request is matched against the stored catalogue for validation.

At S214, the received queries are evaluated using the stored metadata. In some embodiments, each request body is first validated against the JSON schema linked to the referenced function; malformed or type-incompatible arguments trigger an MCP-compliant error response. When validation succeeds, the relevant metadata objects, such as column records or relation entries, are retrieved by key lookup. Since these objects are several orders of magnitude smaller than the underlying snapshot files and reside in performance-tier storage, retrieval incurs minimal latency. If further computation is needed, such as aggregating histogram buckets or applying a similarity threshold, it is executed in-memory on the retrieved metadata without re-reading the raw snapshot files.

At S216, a response to the query is returned to the MCP host. In some embodiments, a message conforming to the catalogue's declared return schema is populated with the metadata values or computed results obtained at S214, serialized in JSON, and transmitted over the same transport channel. The MCP host may incorporate the returned data into higher-level tasks (such as formulating an SQL join plan or generating explanatory text) without further involvement of the backup workflow.

Processing may remain idle until another query is received or a new backup cycle recommences at S202.

Figure 3:
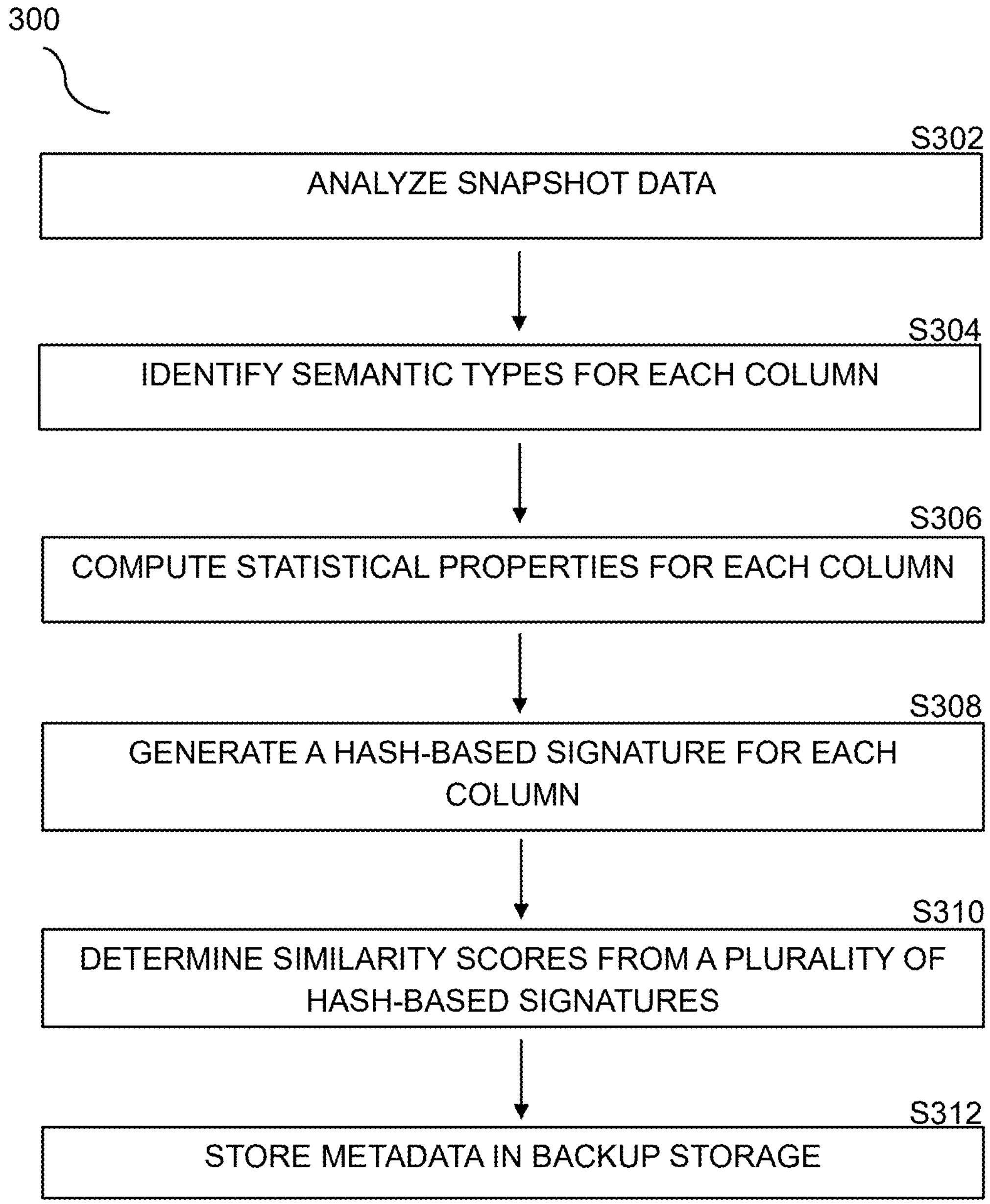
FIG. 3 is a flowchart of an example method of generating metadata that assigns semantic classes, computes statistics, generates hash-based signatures, and derives similarity scores, in accordance with an embodiment of the present disclosure.

FIG. 3 is a flowchart of an example method of generating metadata that assigns semantic classes, computes statistics, generates hash-based signatures, and derives similarity scores, in accordance with an embodiment of the present disclosure. In some embodiments, process 300 provides an expanded, implementation-level view of the generate-metadata operation S204 and the store-metadata operation S206 that are shown in FIG. 2.

At S302, snapshot data are analyzed. In some embodiments, the snapshot is traversed sequentially, and its raw blocks are reconstructed into higher-level table structures. Parsing logic resolves record boundaries, column offsets, and data types so that subsequent column-wise inspection proceeds on coherent structures rather than unstructured byte streams.

At S304, semantic types are identified for each column. In some embodiments, each column's value set is examined for character patterns, numeric ranges, delimiter usage, and other lexical cues. By comparing these observations against an extensible ruleset, the column is categorized into a semantic class, such as timestamp, e-mail address, personal name, currency amount, identifier, or free-form text. Correct classification ensures that later statistical and hashing operations apply metrics suited to the underlying data domain.

At S306, statistical properties are computed. In some embodiments, for every column, descriptive statistics are derived that can include (i) total and distinct value counts, (ii) minimum and maximum values accompanied by selected quantiles, and (iii) a representative frequency histogram.

At S308, a hash-based signature is generated for each column. In some embodiments, compact sketches, such as MinHash, Jaccard-aware digests, or sequence-sensitive hashes, summarize the column's content in a space-efficient form. The signatures enable rapid, in-memory comparison of columns without loading full value sets, while still preserving meaningful similarity information.

At S310, similarity scores are determined by comparing the hash-based signatures derived in S308. In some embodiments, pairwise estimations (e.g., Jaccard indices or composite join-likelihood scores) are generated responsive to a query that specifies a particular pair of columns, rather than being pre-computed for every possible pair, because this pre-computation incurs greater overhead than a simple metadata look-up. In some embodiments, a similarity metric produced in response to a first query may be persisted so that subsequent queries can retrieve the value without re-computation. The semantic classes, statistical descriptors, hash signatures, and similarity scores produced in steps S304-S310 collectively constitute the metadata set for the current snapshot.

At S312, the metadata produced in the foregoing steps are stored in backup storage. In some embodiments, column-level records hold the semantic class, statistical descriptors, hash signatures, and generation timestamp; relation records hold the identifiers of the paired columns together with their similarity metrics. Objects are written as immutable artefacts whose keys embed the snapshot identifier, ensuring that successive snapshots maintain independent metadata versions for audit and retrieval efficiency.

Figure 4:
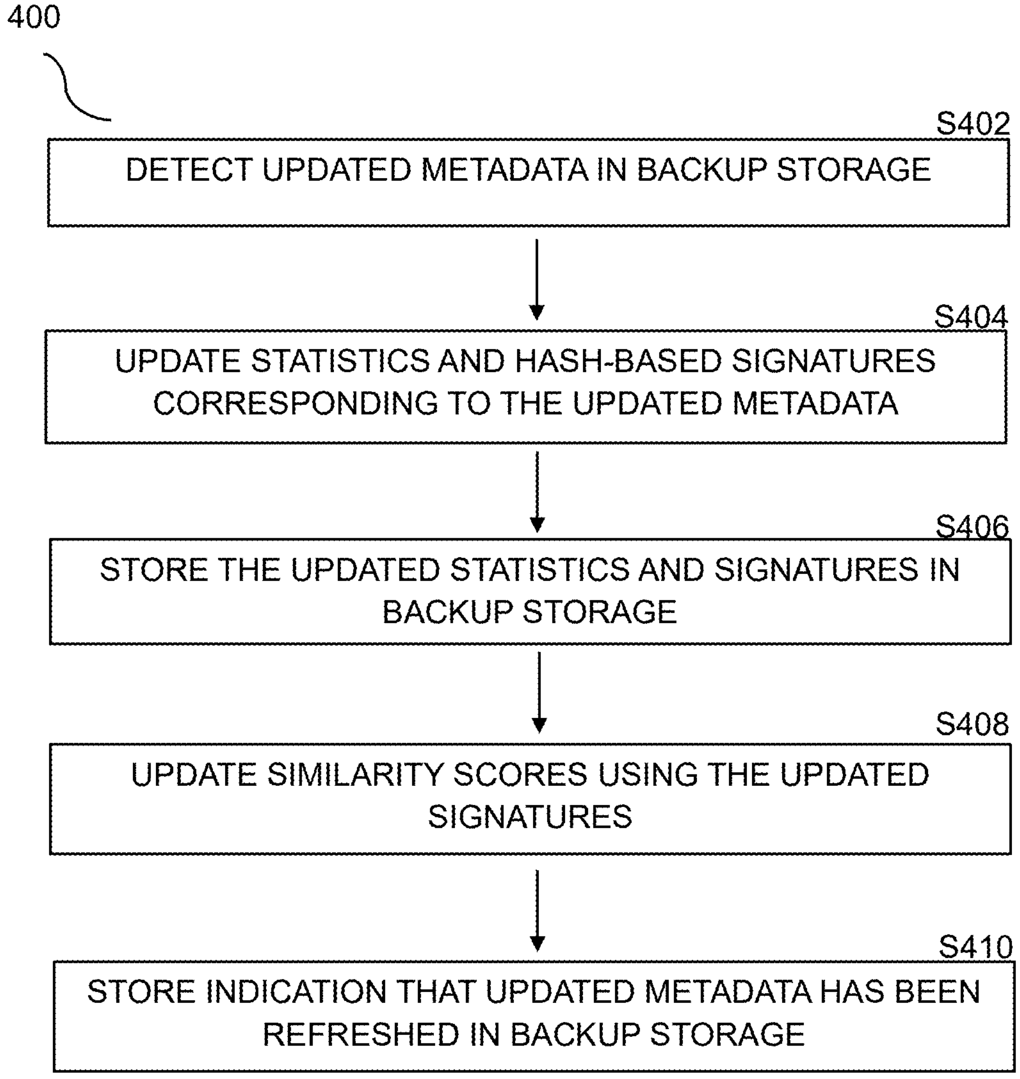
FIG. 4 is a flowchart of an example incremental metadata-index refresh routine, in accordance with an embodiment of the present disclosure.

FIG. 4 is a flowchart of an example incremental metadata-index refresh routine 400, in accordance with an embodiment of the present disclosure. In some embodiments, process 400 provides additional detail for the store-metadata operation S206 of FIG. 2 and the metadata-generation steps S304-S308 of FIG. 3, illustrating an incremental refresh of stored metadata after each snapshot is committed.

At S402, updated metadata in backup storage are detected. To expose a reliable trigger, a metadata store may maintain an indicator, either a version counter or a commit timestamp, that the metadata-generation module increments whenever it finishes writing a new snapshot. The detection process may monitor this indicator by (i) polling on a schedule, (ii) subscribing to an event emitted by the metadata-generation module, or (iii) executing immediately after the metadata-generation module signals completion, and upon detection verifies the corresponding snapshot identifier to ensure that only the newest generation proceeds to the refresh sequence.

At S404, statistics and hash-based signatures corresponding to the updated metadata are refreshed. For each column whose underlying data has changed, the backup system may recompute descriptive statistics (such as total and distinct value counts, minimum and maximum values, selected quantiles, and representative histogram buckets) so that the recalculated descriptive statistics accurately reflect the most-recent snapshot. The backup system may also re-evaluate the column's semantic classification to confirm or, where appropriate, revise the previously assigned data type (for example, timestamp, identifier, or free-form text). Subsequently, it regenerates one or more compact signatures, including MinHash sketches that capture set overlap and, when relevant, sequence-aware digests that preserve ordering characteristics.

At S406, the updated statistics and signatures are stored in backup storage. In some embodiments, the newly computed values overwrite the earlier metadata records. In other embodiments, the values are written as new, versioned objects whose storage keys embed the latest snapshot identifier. Associating each object with that identifier enables downstream components to locate the correct generation deterministically. Consequently, subsequent MCP queries can obtain the refreshed metadata directly, without rescanning the raw snapshot blocks.

At S408, similarity scores are updated using the updated signatures. In some embodiments, the backup system may recalculates relationship metrics, such as Jaccard indices or composite join-likelihood scores, for column pairs affected by the new snapshot. Some implementations may (i) recompute only those pairs referenced in a predefined relation index, or (ii) defer computation until a query requests a particular pair, thereby limiting processing overhead.

At S410, an indication that the updated metadata has been refreshed is stored in backup storage. The indicator may take the form of a version counter, commit timestamp, generation identifier, or any other token that uniquely marks completion of the current refresh cycle. Recording this indication allows downstream processes (such as metadata-aware query handlers or monitoring services) to recognize that the most recent statistics, hash-based signatures, and similarity scores are available for use. Writing only a small control record imposes negligible storage and latency overhead while providing an auditable record of successive metadata updates.

Figure 5:
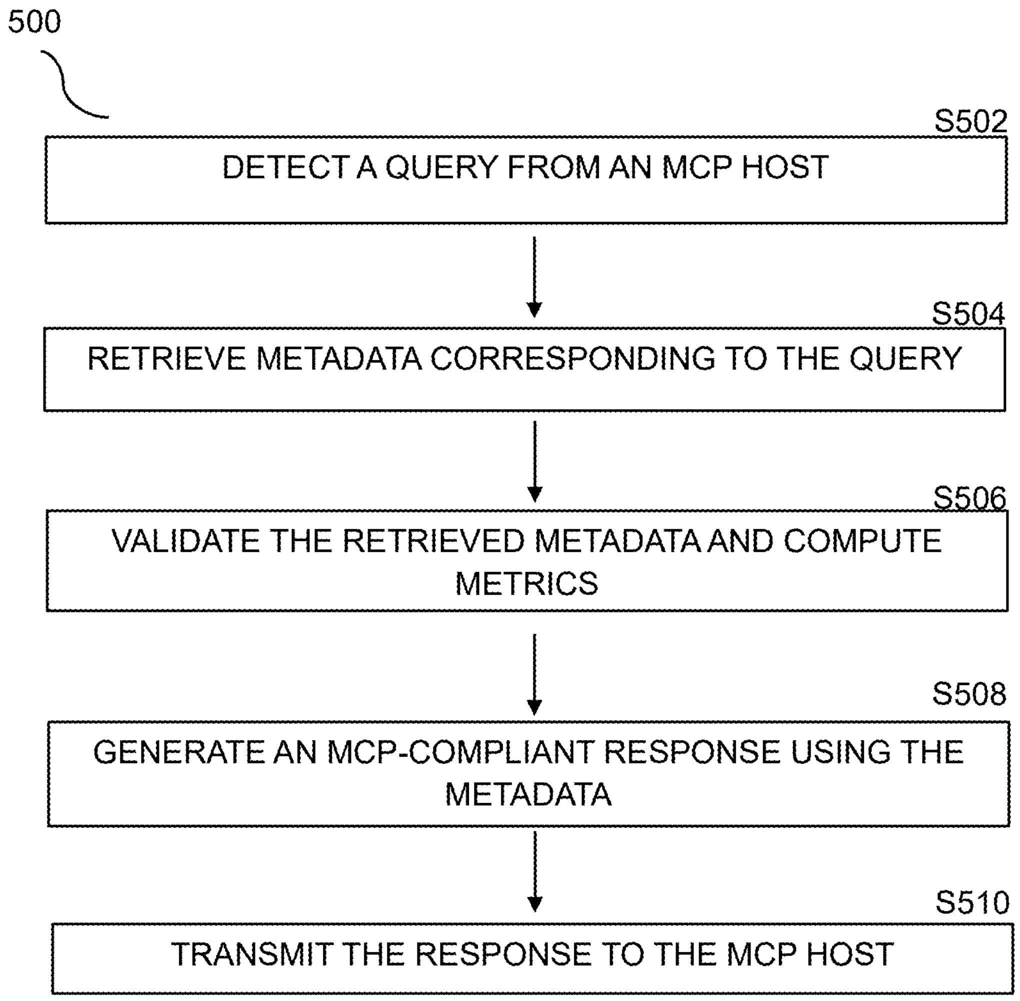
FIG. 5 is a flowchart of an example MCP query-processing routine executed by the backup system, in accordance with an embodiment of the present disclosure.

FIG. 5 is a flowchart of an example MCP query-processing routine executed by the backup system, in accordance with an embodiment of the present disclosure. In some embodiments, process 500 expands upon the receive-queries operation S212, the evaluate-queries operation S214, and the provide-a-response operation S216 depicted in FIG. 2.

At 8502, a query from an MCP host is detected. In some embodiments, a backup system monitors its MCP endpoint for inbound JSON-RPC requests that invoke one of the published functions. When a message arrives, an envelope is parsed to identify the function name and extract its argument list. Preliminary validation against the stored JSON schema may be performed before the request proceeds.

At S504, metadata corresponding to the query is retrieved. In some embodiments, the backup system receives supplied arguments such as snapshot identifier, table name, or column identifier. These identifiers may have been discovered by the MCP host through catalogue functions (e.g. list_tables, list_columns, or list_snapshots) that the backup system exposes to the MCP host. Using the supplied arguments, the backup system may locate and fetch the matching column-metadata records and relation-index entries that were generated during process 300 (FIG. 3). These objects may be compact and reside in performance-tier storage, so retrieval completes with negligible latency.

At S506, the retrieved metadata is validated and metrics are computed. In some embodiments, the backup system may confirm that the fetched records satisfy the request's pre-conditions (for example, correct snapshot generation and valid column IDs). If the invoked function requires further processing, such as aggregating histogram buckets, filtering similarity scores above a threshold, or calculating a null ratio, the metric is computed in-memory using the retrieved metadata.

At S508, an MCP-compliant response using the metadata is generated. In some embodiments, the backup system assembles a response object that adheres to the JSON return schema advertised for the invoked function. The backup system may insert either the raw metadata fetched in S504 or the derived values calculated in S506 and, where applicable, annotates the payload with the snapshot identifier so the host can trace the data's provenance. Before transmission, the object may be passed through the same schema validator used at S502 to guarantee type conformance.

At S510, the response is transmitted to the MCP host. In some embodiments, the response object is serialized and sent over the same MCP transport channel, completing the request-response process while preserving type conformance end-to-end. The routine then returns to an idle state until another MCP query is detected at 8502.

FIG. 6 is a logical diagram illustrating an example metadata-and-relation store 600 that contains a column-metadata table 610 and a column-relation index 630, in accordance with an embodiment of the present disclosure. In some embodiments, store 600 is updated by the metadata-generation module 150 each time the backup system 140 captures a snapshot. After the update, store 600 serves as a compact knowledge base from which the MCP-interface module 160 can retrieve statistics and relationship data in substantially constant time.

For every column observed during a snapshot, the column-metadata table 610 may record a column identifier 612 that uniquely distinguishes the column across snapshots and tenants. The table 610 may also store a source-object reference 614 that maintains lineage to the originating table, file, or other data object. A column name 616 may reflect the label presented by the upstream data platform at capture time. A high-level semantic class 618 (such as timestamp, e-mail address, or UUID) may be assigned by the metadata-generation module 150 through pattern detection and dictionary matching. Basic statistics may be persisted in a value count 620 and a value range 622 (minimum and maximum), while a compact set of representative values 624 affords example content to downstream agents without exposing full datasets. To facilitate similarity estimation without rescanning raw data, a probabilistic statistical signature 626 (for example, a MinHash sketch) may be stored. A last-updated timestamp 628 may indicate when the metadata was most recently refreshed, allowing incremental snapshots to skip re-computation for unchanged columns.

Column-relation index 630 may capture relationships between pairs of columns. Each entry may reference two columns via left-column reference 632 and right-column reference 634, which correspond to identifiers 612. Column overlap may be quantified by a first similarity metric 636, illustratively a set-overlap score (e.g., Jaccard) derived from the signatures 626, and by a second similarity metric 638 that reflects ordered or sequence-based correspondence. The two measures may be combined into a composite join score 640, optionally scaled by a type weighting 642 that leverages the semantic classes 618 to emphasize highly discriminative data types. A sample size 644 records the number of rows or sketch entries evaluated, and a last-computed timestamp 646 indicates when the pairwise metrics were last generated.

During a full snapshot the metadata-generation module 150 may write or update rows in table 610 for each processed column and then refresh the corresponding entries in index 630. Incremental snapshots may update only the records whose underlying data has changed, thereby reducing computational overhead. Once the updated rows are committed, the MCP-interface module 160 may serialize any deltas, embeds them in an MCP-compliant function bundle, and transmits the bundle to the MCP host as described herein. At query time, operations such as "get column metadata" and "get intersections" may be serviced directly from store 600, enabling join planning and statistical look-ups without rescanning snapshot files.

Although FIG. 6 depicts relational tables for illustration, the same logical fields can reside in a document store, key-value map, or in-memory cache. Additional attributes (such as null ratios or histogram bins) may be included, and the relation index may be expanded to cover higher-order column combinations, all without departing from the scope of the present disclosure.

Figure 7:
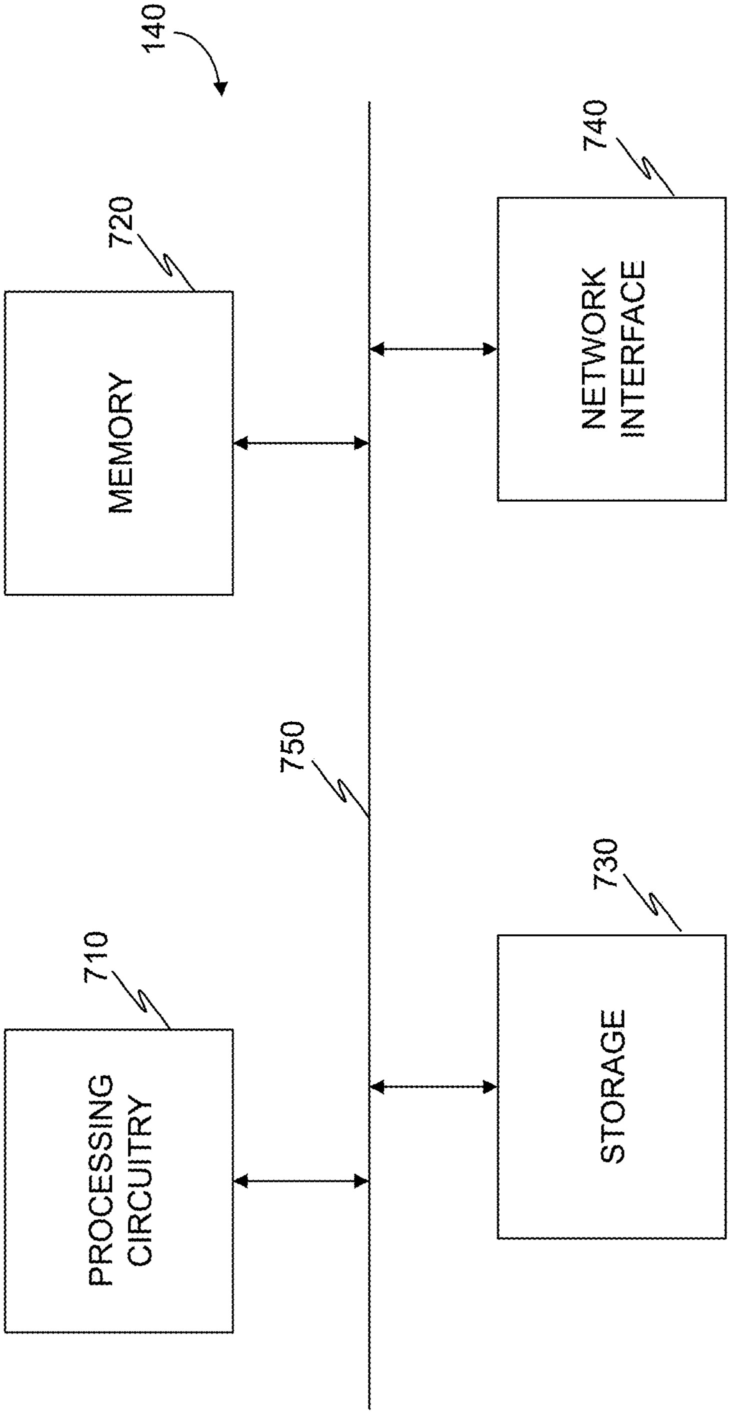
FIG. 7 is a schematic diagram of an example server implementation of a backup system, in accordance with an embodiment of the present disclosure.

FIG. 7 is a schematic diagram of an example server implementation of a backup system 140, in accordance with an embodiment of the present disclosure.

The hardware blocks in FIG. 7 are suitable for executing the functional logic attributed to the metadata-generation module 150, the MCP-interface module 160, and the query-handling process and metadata-refresh process illustrated in FIGS. 1-5, although the same logic may be deployed on other physical or virtual platforms. The backup system 140 includes, according to an embodiment, a processing circuitry 710 coupled to a memory 720, a storage 730, and a network interface 740. In an embodiment, the components of the backup system 140 are communicatively connected via a bus 750.

In certain embodiments, the processing circuitry 710 is realized as one or more hardware logic components and circuits. For example, illustrative types of hardware logic components include field-programmable gate arrays (FPGAs), application-specific integrated circuits (ASICs), application-specific standard products (ASSPs), system-on-a-chip systems (SoCs), graphics processing units (GPUs), tensor processing units (TPUs), artificial-intelligence (AI) accelerators, general-purpose microprocessors, micro-controllers, digital-signal processors (DSPs), and the like, or any other hardware logic components that are configured to perform calculations or other manipulations of information. In some implementations the processing circuitry 710 executes snapshot capture, column-metadata extraction, similarity-metric computation, MCP-function generation, and query evaluation, and conventional scheduling techniques may be employed to avoid resource contention.

In an embodiment, the memory 720 is a volatile memory (e.g., random-access memory), a non-volatile memory (e.g., read-only memory, flash memory), or a combination thereof. The memory may be on-chip, off-chip, or a hybrid arrangement. In certain embodiments, the memory 720 serves as scratch-pad memory for the processing circuitry 710 and may cache (i) active column-metadata rows, (ii) MinHash or other sketch buffers awaiting persistence, and (iii) per-snapshot counters that track columns processed and similarity metrics computed.

In one configuration, software for implementing one or more embodiments disclosed herein is stored in the storage 730, in the memory 720, in a combination thereof, and/or on a separate repository accessible via the network interface 740. "Software" shall be construed broadly to mean any type of instructions, whether referred to as software, firmware, middleware, microcode, hardware-description language, or otherwise. When executed, the instructions cause the processing circuitry 710 to capture snapshots, generate semantic and statistical metadata, compute similarity scores, build MCP-compliant function bundles, and service queries from the MCP host. In some embodiments, the memory 720 or storage 730 maintains a data structure (e.g., a bitmap or table) that tracks which columns have been processed and which MCP functions are pending refresh, allowing the backup system 140 to resume operation without data loss or duplication after a transient failure.

In some embodiments, the storage 730 is magnetic, optical, solid-state, or a combination thereof, and may include a transient staging area that buffers column-metadata batches before transmission, enabling continuous uploads even if the remote backup storage is briefly unreachable.

The network interface 740 is configured to provide the backup system 140 with communication to, for example, the computing environment 110, an MCP host, and backup storage 170. The interface may expose any combination of protocols or APIs required to reach those services, such as REST/JSON for MCP function registration and query responses, and S3-compatible calls for backup-object storage.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for data backup, the method comprising:
capturing, by a backup system, a snapshot of source data from a computing environment;
generating metadata based on the captured snapshot;
storing the generated metadata in backup storage;
generating, within the backup system, Model Context Protocol-compliant functions using the stored metadata;
transmitting the Model Context Protocol-compliant functions to a Model Context Protocol host;
receiving, from the Model Context Protocol host, queries corresponding to at least one of transmitted functions;
evaluating the received queries; and
providing, to the Model Context Protocol host, a response corresponding to the queries.

2. The method of claim 1, wherein storing the generated metadata in backup storage further comprises storing the metadata in objects that are physically separate from backup files that contain raw data blocks of the snapshot.

3. The method of claim 1, wherein generating the Model Context Protocol-compliant functions comprises defining at least a list tables function, a get column metadata function, a get intersections function, and a get column distribution function, each having a declared argument schema and return-value schema.

4. The method of claim 1, wherein receiving the queries further comprises validating each query against a stored JSON schema that corresponds to the identified Model Context Protocol-compliant function before evaluating the query.

5. The method of claim 1, wherein transmitting the Model Context Protocol-compliant functions to the Model-Context-Protocol host comprises serializing the functions and their respective schemas in a canonical JSON representation.

6. The method of claim 1, wherein generating the metadata comprises, for each column reconstructed from the snapshot, performing at least one of: assigning a semantic class, computing at least one descriptive statistic, and generating a hash-based signature.

7. The method of claim 1, further comprising, in response to a change in the Model Context Protocol-compliant functions or their associated schemas, detecting that updated metadata have been stored in the backup storage, regenerating the Model Context Protocol-compliant functions using the updated metadata, and retransmitting the regenerated functions to the Model Context Protocol host.

8. The method of claim 1, wherein providing the response comprises, for each received query, generating a JSON object that conforms to a return-value schema of the Model Context Protocol-compliant function.

9. The method of claim 1, wherein evaluating the received queries comprises retrieving, from the backup storage and without accessing backup files that store the snapshot, metadata identified by the queries.

10. A non-transitory computer-readable medium storing a set of instructions for data backup, the set of instructions comprising:
one or more instructions that, when executed by one or more processors of a device, cause the device to:
capture, by a backup system, a snapshot of source data from a computing environment;
generate metadata based on the captured snapshot;
store the generated metadata in backup storage;
generate, within the backup system, Model Context Protocol-compliant functions using the stored metadata;
transmit the Model Context Protocol-compliant functions to a Model Context Protocol host;
receive, from the Model Context Protocol host, queries corresponding to at least one of the transmitted functions;
evaluate the received queries; and
provide, to the Model Context Protocol host, a response corresponding to the queries.

11. The non-transitory computer-readable medium of claim 10, wherein the instructions that store the generated metadata further comprise instructions that, when executed, cause the device to store the metadata in objects that are physically separate from backup files containing raw data blocks of the snapshot.

12. A system for data backup comprising:
a processing circuitry comprising one or more processors;
a memory, the memory containing instructions that, when executed by the processing circuitry, configure the system to:
capture, by a backup system, a snapshot of source data from a computing environment;
generate metadata based on the captured snapshot;
store the generated metadata in backup storage;
generate, within the backup system, Model Context Protocol-compliant functions using the stored metadata;
transmit the Model Context Protocol-compliant functions to a Model Context Protocol host;
receive, from the Model Context Protocol host, queries corresponding to at least one of the transmitted functions;
evaluate the received queries; and
provide, to the Model Context Protocol host, a response corresponding to the queries.

13. The system of claim 12, wherein the one or more processors, when storing the generated metadata in backup storage further, are configured to store the metadata in objects that are physically separate from backup files that contain raw data blocks of the snapshot.

14. The system of claim 12, wherein the one or more processors, when generating the Model Context Protocol-compliant functions, are configured to define at least a list tables function, a get column metadata function, a get intersections function, and a get column distribution function, each having a declared argument schema and return-value schema.

15. The system of claim 12, wherein the one or more processors, when receiving the queries further, are configured to validate each query against a stored JSON schema that corresponds to the identified Model Context Protocol-compliant function before evaluating the query.

16. The system of claim 12, wherein the one or more processors, when transmitting the Model Context Protocol-compliant functions to the Model-Context-Protocol host, are configured to serialize the functions and their respective schemas in a canonical JSON representation.

17. The system of claim 12, wherein the memory further stores instructions that, when executed, cause the processing circuitry, for each column reconstructed from the snapshot, to perform at least one of:
assign a semantic class, computing at least one descriptive statistic, and generating a hash-based signature.

18. The system of claim 12, wherein the memory further stores instructions that, when executed, cause the processing circuitry, in response to a change in the Model Context Protocol-compliant functions or their associated schemas, to:

detect that updated metadata have been stored in the backup storage, regenerate the Model Context Protocol-compliant functions using the updated metadata, and retransmit the regenerated functions to the Model Context Protocol host.

19. The system of claim 12, wherein the one or more processors, when providing the response, are configured to generate, for each received query, a JSON object that conforms to a return-value schema of the Model Context Protocol-compliant function to which the query corresponds.

20. The system of claim 12, wherein the one or more processors, when evaluating the received queries, are configured to retrieve, from the backup storage and without accessing backup files that store the snapshot, metadata identified by the queries.

* * * * *